(12) United States Patent
Connell et al.

(10) Patent No.: US 8,322,454 B2
(45) Date of Patent: Dec. 4, 2012

(54) STRUCTURE FOR ATTACHING A TOOL TO A FRAME TUBE

(75) Inventors: Richard J. Connell, Slater, IA (US);
Ryan A. Hackert, Oskaloosa, IA (US);
Mark D. Beeck, Ankeny, IA (US)

(73) Assignee: Deere & Company, Moline, IL (US)

( * ) Notice: Subject to any disclaimer, the term of this patent is extended or adjusted under 35 U.S.C. 154(b) by 166 days.

(21) Appl. No.: 12/878,617

(22) Filed: Sep. 9, 2010

(65) Prior Publication Data
US 2012/0061113 A1  Mar. 15, 2012

(51) Int. Cl.
*A01B 15/00* (2006.01)
(52) U.S. Cl. ........ 172/681; 172/763; 248/72; 248/228.3
(58) Field of Classification Search ............... 172/745, 172/751, 763, 681, 762; 248/72, 73, 74.1, 248/74.5, 228.3
See application file for complete search history.

(56) References Cited

U.S. PATENT DOCUMENTS

| | | | | |
|---|---|---|---|---|
| 750,595 A * | 1/1904 | Campbell | | 248/250 |
| 759,560 A * | 5/1904 | Sharp | | 5/282.1 |
| 971,438 A * | 9/1910 | Gillitt | | 248/227.4 |
| 1,416,679 A * | 5/1922 | Barry | | 248/72 |
| 1,473,504 A * | 11/1923 | Neely | | 191/40 |
| 1,974,628 A * | 9/1934 | Presley | | 248/228.3 |
| 2,464,225 A * | 3/1949 | Graham | | 403/387 |
| 2,595,352 A * | 5/1952 | Graham | | 172/681 |
| 2,617,346 A * | 11/1952 | Jeoffroy | | 172/681 |
| 2,916,244 A * | 12/1959 | Renfroe | | 248/228.2 |
| 2,926,880 A * | 3/1960 | Bourgeois | | 248/327 |
| 2,973,176 A * | 2/1961 | Malafouris | | 248/228.3 |
| 3,469,810 A * | 9/1969 | Dorris | | 248/228.3 |
| 3,876,046 A * | 4/1975 | Lerner et al. | | 191/29 R |
| 3,993,279 A * | 11/1976 | Holt | | 248/235 |
| 4,717,102 A * | 1/1988 | Pflieger | | 248/228.1 |
| 4,846,431 A * | 7/1989 | Pflieger | | 248/228.4 |
| 4,896,851 A * | 1/1990 | Shaull | | 248/72 |
| 5,104,079 A * | 4/1992 | Hardtke | | 248/228.5 |
| 5,240,423 A * | 8/1993 | Morrison | | 439/92 |
| 5,316,244 A * | 5/1994 | Zetena, Jr. | | 248/49 |

* cited by examiner

*Primary Examiner* — Jamie L McGowan

(57) ABSTRACT

Gang tube rail structure is attached to the lower front and rear corners of the implement gang tube to provide a lower clamp support. Two pivoting clamp jaws are attached to the clamp support and secured against the support by tightening a single clamp bolt extending between the lowermost portions of the jaws. A locator shoe is secured between the tube and the c-spring and includes a protrusion that projects into a hole in the c-spring. The ends of the locator shoe include short legs that wrap around the gang tube rail. The single clamp bolt provides a vertical clamp force that is approximately twice the tension generated in the bolt when the nut is tightened.

16 Claims, 3 Drawing Sheets

STRUCTURE FOR ATTACHING A TOOL TO A FRAME TUBE

FIELD OF THE INVENTION

The present invention relates generally to attaching structure for mounting tools on a frame tube of an implement and, more specifically, to attaching structure for mounting structure such as a disk gang c-spring or standard to the lower portion of a frame or gang tube.

BACKGROUND OF THE INVENTION

Traditional disk gang c-spring attachments wrap around the gang tube with u-bolts or bolts and plates. The c-spring is typically clamped to the lower surface of the gang tube. Bolts and plates or u-bolts clamp over the top of the tube. Having portions of components projecting over the tube introduces interference problems when utilizing a common gang tube for multiple disk blade spacings because several locations on the top of the gang tube must be kept free of hardware to attach other frame members or other implement components.

SUMMARY OF THE INVENTION

Formed gang tube rail structure is attached to the lower front and rear corners of the implement gang tube to provide a lower clamp support. A clamping structure comprises two pivoting clamp members having jaws are attached to the clamp support and secured against the support by tightening a single clamp bolt extending through trunnions in the lowermost portions of the clamp members. To positively position a c-spring, a locator shoe is secured between the tube and the c-spring and includes a protrusion that projects into a hole in the c-spring. In addition to the protrusion, the ends of the locator shoe include short legs that respectively wrap around the gang tube rails at the front and rear tube corners and acts together with short down-turned legs that embrace the sides of the c-spring to prevent relative motion. The geometry of the clamp support rails, clamp member jaws and bolt result in a vertical clamp force that is a multiple of the tension generated in the bolt when the nut is tightened. The resulting mechanical advantage reduces the force needed to provide a tight joint. A single clamp bolt and nut provide quick assembly for reduced cost and quick and easy field service. Different mounting locations along the length of the rail structure can be selected while avoiding any interference with hardware near the top of the frame tube.

DESCRIPTION OF THE PREFERRED EMBODIMENT

Figure 1:
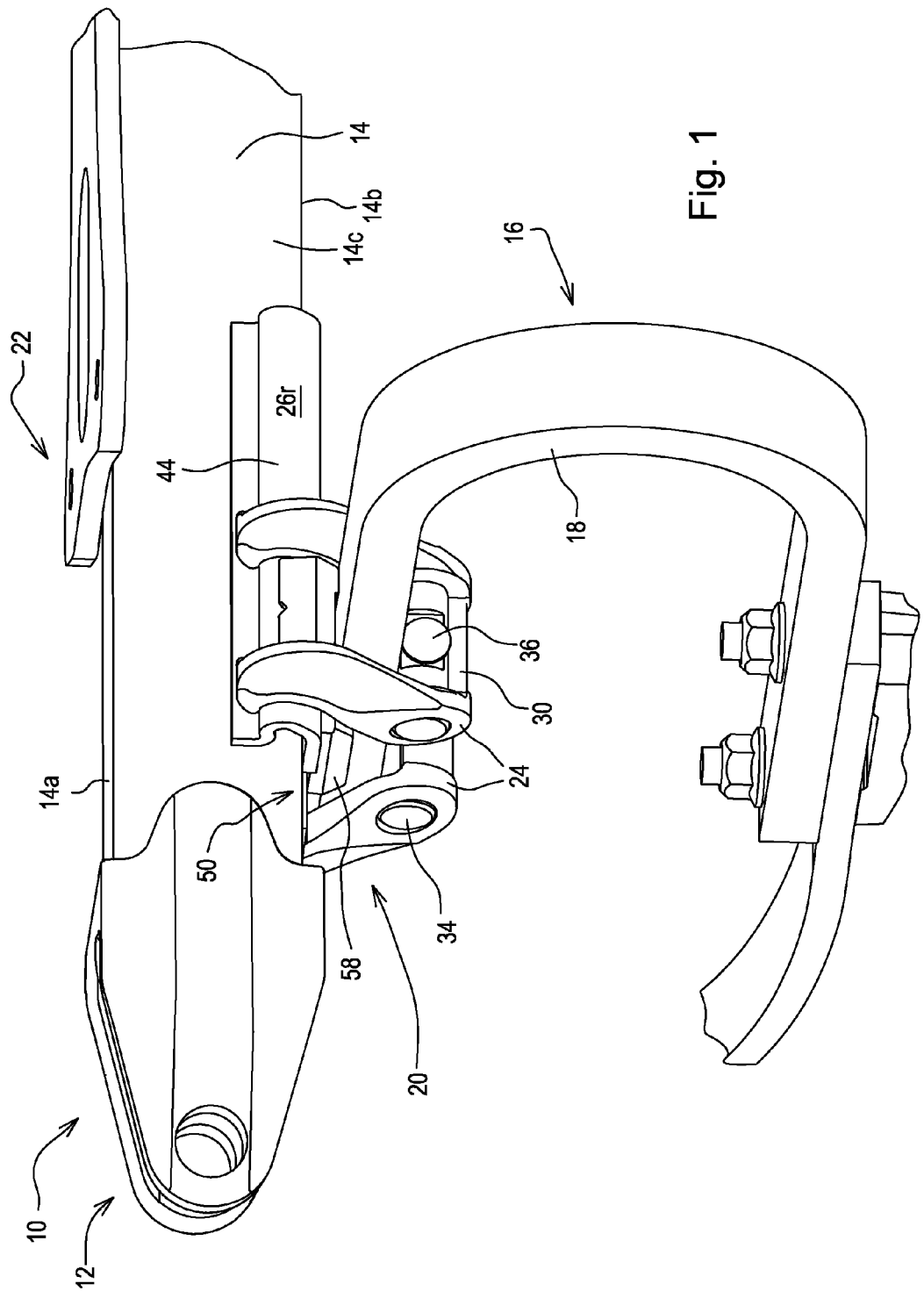
FIG. 1 is a perspective view of a portion of a tillage implement frame including a tool clamp supporting a shank on frame rails.

Referring to FIG. 1, therein is shown a portion of an implement 10 having a main frame 12 with a generally transversely extending frame member or frame tube 14 of rectangular cross section. The frame tube 14 includes an uppermost wall 14a and lowermost wall 14b joined by upright fore-and-aft spaced walls 14c. The implement 10 is shown as a tillage implement supporting disk structure (not shown) from a tool support or shank assembly 16. However, it is to be understood that other types of tool supports or shank assemblies may also be used with the structure described below.

The shank assembly 16 includes a c-shank or standard 18 supported by a tool mount structure 20 from the lower extremity of the frame tube 14 so that none of the structure 20 projects above the plane of the uppermost wall 14a of the frame tube 14. Additional mounting structure 22 may be connected to the frame tube 14 directly above the tool mount structure 20 for supporting frame components or other implement structure.

Figure 2:
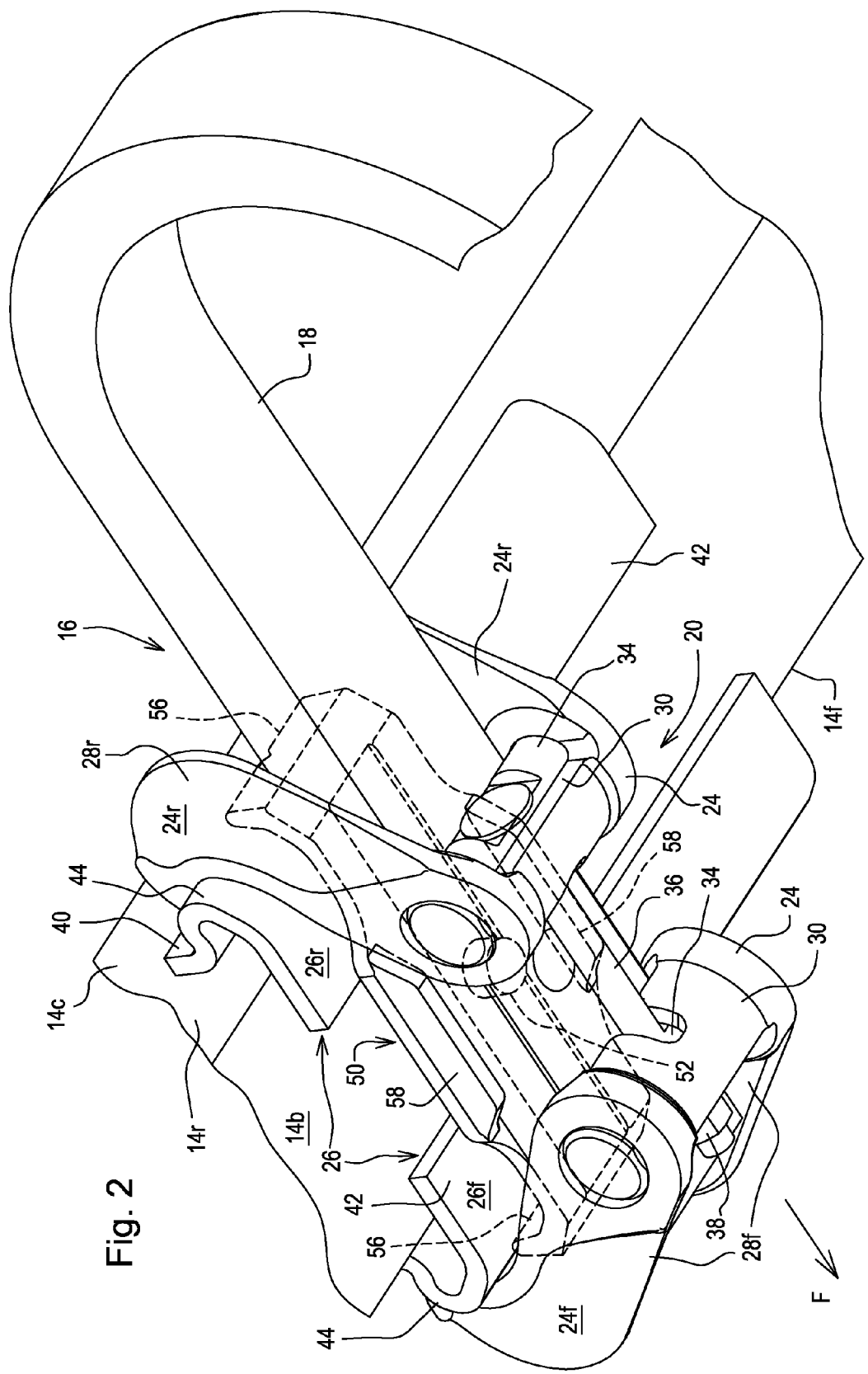
FIG. 2 is an enlarged lower perspective view of the tool clamp and frame rails of FIG. 1.
Figure 3:
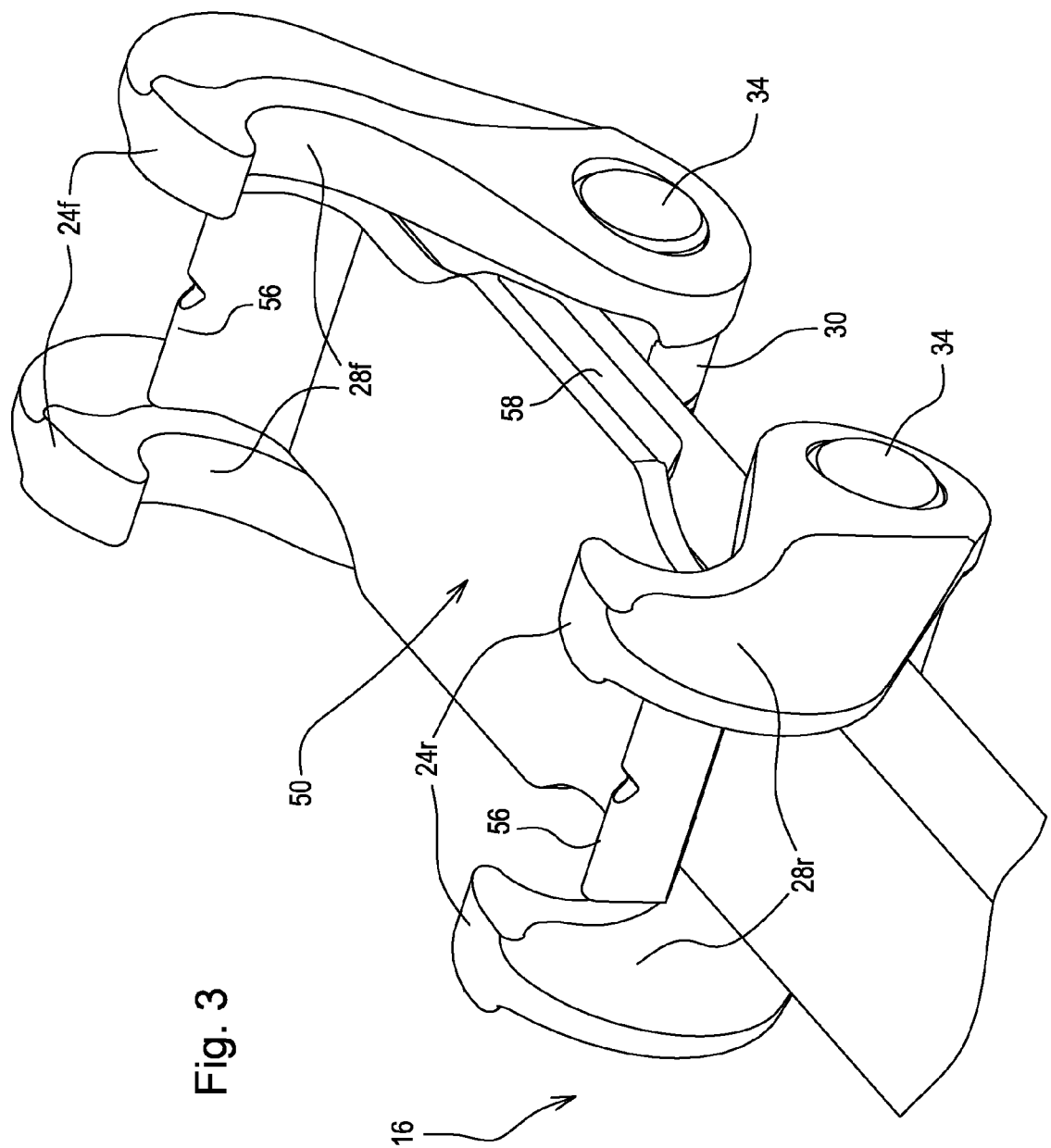
FIG. 3 is a perspective view of the tool clamp of FIG. 1 removed from the frame rails to better show the locator shoe.

The tool mount structure 20 includes a clamping structure 24 and a rail structure 26 releasably supporting the clamping structure 24 adjacent lower front and rear corners 14f and 14r of the frame tube 14. The clamping structure 24 includes front and rear generally identical clamp members 24f and 24r, respectfully, which are formed as castings having transversely spaced, J-shaped legs 28f, 28r (FIG. 2) that generally embrace the sides of the c-shank 18 and have upper ends defining jaws that extend upwardly and around the rail structure 26. Each clamp member 24f, 24r includes a lower connecting portion 30 supporting a pivoting bolt-receiving member 34, thereby defining a trunnion member. A clamping bolt 36 extends through the bolt-receiving members 34, and a nut 38 is threaded onto one end of the bolt 36 to draw the lower connecting portions 30 together and tighten the clamp members 24f and 24r against the rail structure 26. As the clamping bolt 36 is tightened, the lower connecting portions 30 of the clamp members 24f and 24r of the clamping structure 24 will move upwardly against the c-shank 18.

The rail structure 26 includes front and rear rails 26f, 26r with a J-shaped cross section. Upturned flanges 40 on the rails 26f, 26r are welded to the respective walls 14c near the lower front and rear corners 14f, 14r. Leg portions 42 are welded to the lower most wall 14b. The rails 26f, 26r include curved portions 44 conforming to the shape of the jaws defined by the upper ends of the clamp members 24r, 24f and support the clamp members in both a loosened state during assembly and a tightened state when the bolt 36 is tensioned to secure the c-shank 18 to the frame tube 14.

To positively position the c-spring 18 or other tool support member, an insert or locator shoe 50 is supported between the frame tube 14 and the c-spring 18. The locator shoe 50 conforms to the shape of the c-spring 18 or other supported member. As shown, the locator shoe 50 includes a protrusion 52 that projects into a hole in the c-spring 18. In addition to the protrusion 52, ends of the locator shoe 50 include short legs 56 that wrap around the rails 26f, 26r and act together with downturned sides 58 that embrace the c-shank to help prevent relative motion between components.

As the clamping bolt 36 is tightened to draw the lower connecting portions 30 of the clamp members 24f and 24r together, the top face of the locator shoe 50 is urged upwardly against lower surfaces on the leg portions 42 of the front and rear rails 26f and 26r of the rail structure 26, and the c-shank 18 is firmly secured in position between the shoe 50 and the clamp members 24f and 24r of the clamping structure 24. The geometry of the clamp members 24f, 24r and bolt 36 result in a vertical clamp force that is a multiple of the tension generated in the bolt 36 when the nut 38 is tightened. The single clamping bolt 36 and nut 38 provide a mechanical advantage that reduces the force needed to provide a tight joint. The above-described structure reduces the number of tightening operations during assembly compared to a conventional mounting arrangement.

Having described the preferred embodiment, it will become apparent that various modifications can be made without departing from the scope of the invention as defined in the accompanying claims.

The invention claimed is:

1. A tool mount for connecting a tool shank to a horizontal frame member of an implement, the frame member having upper and lower faces joined by front and rear sides, the tool mount comprising:
   first and second spaced rail members disposed horizontally and respectively being connected to lowermost portions of the front and rear sides of the frame member;
   a tool support including opposed first and second clamp members having upper ends defining jaws respectively engaging the first and second spaced rail members and being joined to lower ends spaced below the frame member, with each clamp member defining a tool shank-receiving opening below, and extending crosswise to, the frame member;
   a jaw tightening member extending between the opposed clamp members below the spaced rail members and the tool shank-receiving opening of each clamp member to urge lower portions of the clamp members towards each other to clamp the tool support to the rail members at the lowermost portion of the front and rear sides of the frame member independently of additional fasteners above the rail members.

2. The tool mount as set forth in claim 1 wherein the jaw tightening member includes a bolt-receiving member pivotally mounted to a lower portion of each clamp member, thereby defining a trunnion, and a bolt extending between the clamp members and through the bolt-receiving member of each clamp member and having a nut on one end that is tightenable for drawing the lower ends of the clamp members together.

3. The tool mount as set forth in claim 1 wherein the frame member is substantially rectangular in cross section thereby defining first and second lower corners; the first and second rails comprise respective metal plates formed so as to have a J-shaped cross section and being respectively fixed to said frame member so as to extend along said first and second lower corners of the frame member.

4. The tool mount as set forth in claim 1 wherein the rails and jaws are shaped such as to permit the jaws to pivot on the rails and wherein the jaw tightening member includes a bolt extending between the clamp members and tightenable to draw the lower ends together and upwardly towards the frame member.

5. A tool mount for connecting a tool shank to a horizontal frame member of an implement, the tool mount comprising:
   first and second spaced rail members disposed horizontally and respectively being connected to opposite sides of a lowermost portion of the frame member;
   a tool support including opposed first and second clamp members having upper ends defining jaws respectively engaging the first and second spaced rail members, with the clamp members depending from the rail members and defining a tool shank-receiving portion below the frame member;
   a jaw tightening member extending between the opposed clamp members below the spaced rail members and the tool shank-receiving portion to urge lower portions of the clamp members towards each other to clamp the tool shank to the rail members at the lowermost portion of the frame member independently of additional fasteners above the rail members; and
   a positioning member located in the tool shank-receiving portion mating with the clamp members and the tool shank and preventing relative movement of the tool shank and the rail members.

6. The tool mount as set forth in claim 5 wherein the positioning member includes legs embracing the rail members.

7. A tool mount for connecting a tool shank to a horizontal, transverse frame member of an implement, the frame member having upper and lower faces joined by front and rear sides, the tool mount comprising:
   spaced horizontal, parallel front and rear rails respectively being connected to lowermost portions of the front and rear sides of the frame member;
   a clamping structure including opposed first and second clamp members having upper ends defining first and second jaws respectively engaging the spaced rail members, the clamp members depending from the rail members and defining a tool shank-receiving portion below the frame member, with respective engaged surfaces of the rails and jaws being shaped such that the tool shank receiving portions of the clamp members move upwardly as lower ends of the clamp members are moved toward each other;
   a jaw tightening member extending between the opposed clamp members below the tool shank-receiving portion, and hence below the lower face of the frame member, and acting to urge the clamp jaws towards each other and urge the shank-receiving portion upwardly towards the lower face of the frame member so as to impart a clamping force on a tool shank received in the shank-receiving portion, the clamp members and rails thus being located substantially below the upper face of the frame.

8. The tool mount as set forth in claim 7 wherein the first and second rails are respectively connected to lowermost corners of the frame member defined by the lowermost face and the front and rear sides.

9. The tool mount as set forth in claim 7 wherein the clamp members are each j-shaped in side view, with the rail members having mating cross sections which respectively mate with the engaged surfaces of the jaws.

10. The tool mount as set forth in claim 9 wherein the jaw-tightening member comprises a bolt member extending between lower ends of the clamp members.

11. The tool mount as set forth in 7 wherein the clamp members together with the jaw tightening member are supported from the rail members independently of additional fasteners.

12. The tool mount as set forth in claim 11 wherein first and second bolt-receiving members are respectively mounted in lower portions of said first and second clamp members for rotation about horizontal, parallel first and second axes, and wherein the jaw tightening member comprises a single bolt extending through the bolt-receiving members.

13. A tool mount for connecting a tool shank to a horizontal, transverse frame member of an implement, the frame member having upper and lower faces joined by front and rear sides, the tool mount comprising:
   spaced rail members connected to a lowermost portion of the front and rear sides of the frame member;
   a clamping structure including opposed first and second clamp members having upper ends defining first and second jaws respectively engaging the spaced rail members, the clamp members depending from the rail members and defining a tool shank-receiving portion below the frame member;

a jaw tightening member extending between the opposed clamp members below the tool shank-receiving portion, and hence below the lower face of the frame member, and acting to urge the clamp members towards each other and to impart an upward clamping force on a tool shank received in the shank-receiving portion, with the clamp members and rails thus being located substantially below the upper face of the frame; and a tool mounting insert being connected between the clamp members for engaging the tool shank and the rails.

14. The tool mount as set forth in claim 13 wherein the insert includes an indexing portion for mating with the tool shank.

15. The tool mount as set forth in claim 11 wherein the insert includes downturned sides embracing opposite sides of the tool shank.

16. The tool mount as set forth in claim 13 wherein the insert includes ends embracing the rail members.

* * * * *